UNITED STATES PATENT OFFICE.

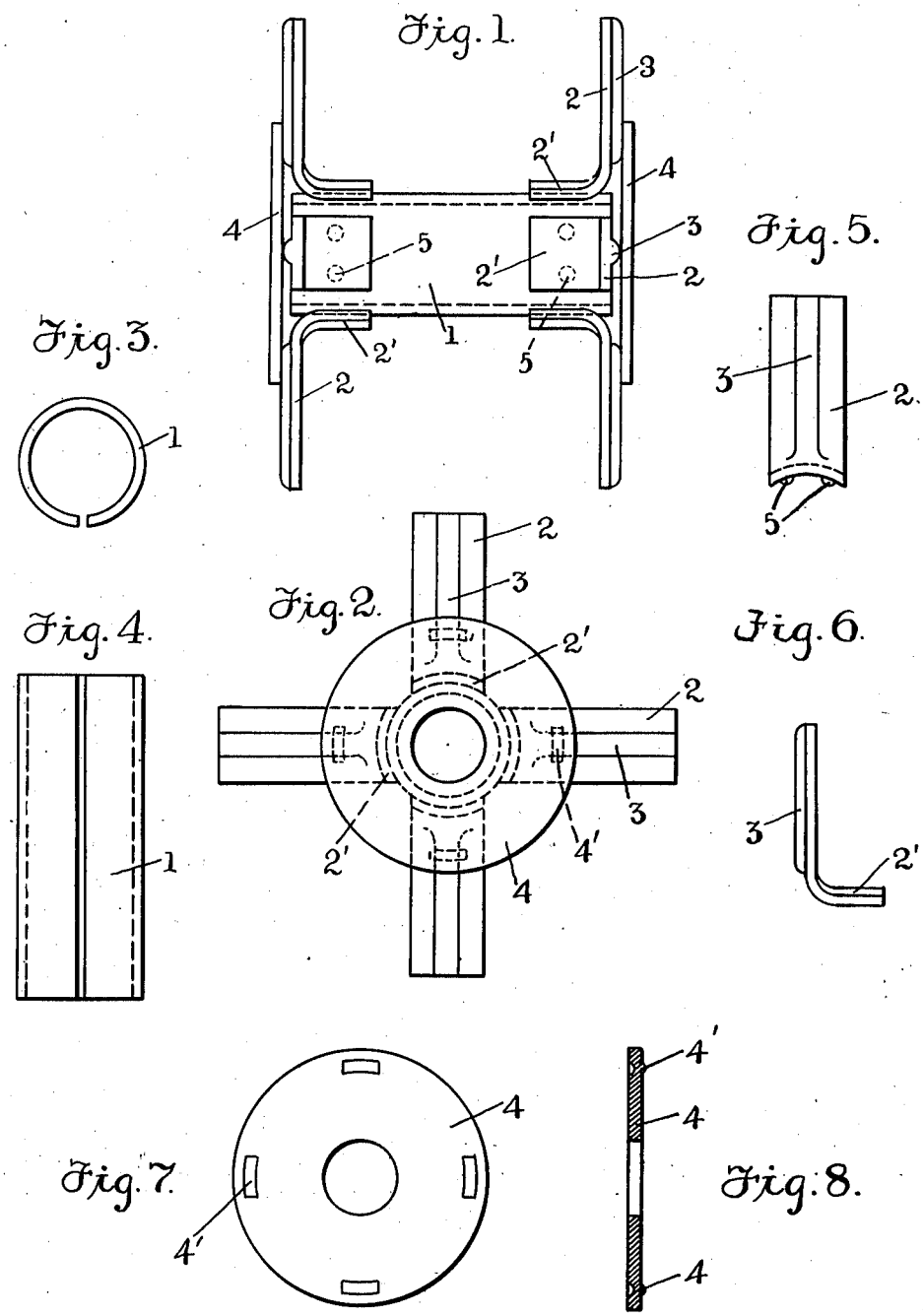

ADOLPH F. RIETZEL, OF CHARLESTOWN, RHODE ISLAND, ASSIGNOR TO WALLACE H. ROWE, OF PITTSBURG, PENNSYLVANIA.

REEL.

970,986.

Specification of Letters Patent. Patented Sept. 20, 1910.

Original application filed June 11, 1909, Serial No. 501,505. Divided and this application filed November 26, 1909. Serial No. 529,848.

*To all whom it may concern:*

Be it known that I, ADOLPH F. RIETZEL, a citizen of the United States, and a resident of Charlestown, in the county of Washington and State of Rhode Island, have invented certain new and useful Improvements in Reels, of which the following is a specification.

My invention relates to the construction of reels made entirely of metal for holding and shipping barbed or other wire or for other purposes.

The main object of my invention is to provide a reel which shall be stronger, cheaper and lighter than the wooden reels customarily employed for holding and shipping metal wire and which shall also have the advantage of being indestructible by fire or rough handling and shall not be liable to collapse even when heavily loaded.

A further object of the invention is to provide reels of such construction that they will all be of a uniform weight when constructed of the same material and size, as the wooden reels which have heretofore been most commonly employed in practice will vary greatly in weight even under a uniform size.

A still further object of my invention is to provide a construction of reel, the individual parts of which may be assembled by means of the electric welding process, thereby greatly reducing the cost of construction and increasing the strength, owing to the fact that a reel, although made up of a number of separate parts will, when finished, be practically an integral structure.

To these ends my invention consists in the novel construction of reel hereinafter more particularly described and then specified in the claims.

In the accompanying drawings, Figure 1 is a plan of a completed reel constructed in accordance with my invention. Fig. 2 is an end elevation of the same. Fig. 3 is an end view of the metal tube forming the body or drum of the reel. Fig. 4 is a plan of said body or drum. Fig. 5 is an elevation of the metal plate or strip constituting an arm of the reel. Fig. 6 is an edge view of the arm shown in Fig. 5. Fig. 7 is a plan and Fig. 8 a vertical cross-section through a strengthening plate or flange that may be employed for strengthening the skeleton reel made by the union of the parts shown in Figs. 3, 4, 5 and 6.

Referring to the drawings, the body or drum of the reel shown at 1 consists of a sheet metal tube or other metal tube and may be constructed of a piece of sheet metal bent up to form, as indicated in Figs. 3 and 4, although I do not limit myself to a body or drum formed in this way as other styles of tubing might be employed without departing from the spirit of my invention.

The arms 2 of the reel consist also of metal strips or plates whose ends 2' are bent at right angles to the major portion forming the radially extending arm or wing and are shaped or curved as indicated in Figs. 5 and 6, to conform to the cylindrical or curved surface of the drum portion 1 so as to fit thereon. These strips or plates 2 are also preferably ribbed radially with one or more ribs indicated at 3, which ribs are useful not only for stiffening the arms but also afford welding projections by which a strengthening plate or washer 4 may be welded to the end of the reel. The end portions of the strips are provided also with suitable welding projections indicated at 5, made in any desired way, as for instance by indenting the metal strip so as to form welding contacts or spots of limited area on the inner face of the bent portion 2' which shall engage the periphery of the tube and serve to localize the electric welding current passed from the strip to the tube or body 1 and thereby localize the electric heating in the electric welding operation of welding the strip to the tube. Any number of such welding projections may be provided on either or both of the parts to be joined, as well understood in the art, and the localization of the heating and of the pressure at the spots where the welding is to be effected may be produced in any other way, without departing from my invention. In this process of welding the arms to the drum by the electric welding process, suitable conducting electrodes adapted to support the parts so ply current thereto and apply pressure the required direction for welding a plasticity has been reached are employed will be well understood by those verse the electric metal working art.

To strengthen the reel it is preferab apply the end plates, flanges or was which may consist of plates welded directly to the arms 2. These plates 4 are furnished preferably with the welding projections 4' made in any way, as for instance by indenting the metal plate 4 and are located in position so that when applied to the end of the skeleton reel they will engage upon the arms 2 and preferably upon the ribs 3 with which the latter are furnished. When the ribs 3 and projections 4' are curved it is obvious that they will engage at their crossing point by a mere contact point or spot affording an effective means of localizing the electric heating of the parts in the electric welding operation of uniting the arms and plate. The union of these parts by these welding projections used in the electric welding process is also effected in the way ordinarily employed, as for instance by means of electrodes of suitable shape between which the parts are inserted in properly assembled position and by which the heating current and pressure are applied.

I do not limit myself to any particular method of electrically welding the arms and plate together at spots in their opposed or meeting surfaces but prefer to employ projections as described for locating the spots of union and localizing the electric heating and welding pressure. Obviously further, it would be within my invention to provide welding projections of other forms and differently disposed upon the portions of the reel which are welded together.

My present application constitutes a division of my prior application filed June 11, 1909, Serial No. 501,505.

What I claim as my invention is:

1. A metal reel comprising a tubular body portion and metal wings or arms consisting of metal strips having bent inner ends and welded by the faces of said bent ends to the peripheral face of the tube.

2. In a metal reel, a body portion consisting of a metal tube and reel arms or wings consisting of metal strips having bent inner ends, shaped to fit the contour of the tube and united by welding projections to the peripheral face of the tube near its end.

3. A metal reel comprising a tubular body portion and reel arms or wings consisting of metal strips or plates having radial ribs and bent ends, bent to lie against the peripheral face of the tube and welded by a face of said bent end to the face of the tube.

4. In a metal reel, a metal tube forming the body portion thereof, wings or arms radially ribbed and having bent inner ends welded by their faces to the peripheral face of the tube and strengthening plates or washers welded to the arms or wings by their radial ribs.

5. In a metal reel, a tubular body portion combined with ribbed wings or arms welded to the body portion and a strengthening plate or washer united to the arms by welding projections afforded by the ribs.

Signed at Lynn in the county of Essex and State of Mass. this 23rd day of Nov. A. D. 1909.

ADOLPH F. RIETZEL.

Witnesses:
E. G. MITCHELL,
JAMES F. DEARBORN.